United States Patent [19]

Griset

[11] Patent Number: 4,490,920
[45] Date of Patent: Jan. 1, 1985

[54] GUIDE CLAMP

[76] Inventor: Norman Griset, 380 Jennifer La., Orange, Calif. 92669

[21] Appl. No.: 512,366

[22] Filed: Jul. 11, 1983

Related U.S. Application Data

[63] Continuation-in-part of Ser. No. 326,840, Dec. 3, 1981, Pat. No. 4,394,800.

[51] Int. Cl.$^3$ .............................................. B43L 13/02
[52] U.S. Cl. ......................................... 33/443; 33/42; 33/32 C; 83/614
[58] Field of Search ................. 33/443, 430, 437, 434, 33/445, 448, 32 C, 32 R, 42

[56] References Cited

U.S. PATENT DOCUMENTS

| | | | |
|---|---|---|---|
| 490,086 | 1/1893 | Saum | 33/443 |
| 2,854,751 | 10/1958 | Casey | 33/443 |
| 4,095,345 | 6/1978 | Smith | 33/443 |
| 4,394,800 | 7/1983 | Griset | 33/443 |

FOREIGN PATENT DOCUMENTS

| | | | |
|---|---|---|---|
| 819372 | 7/1949 | Fed. Rep. of Germany | 33/443 |
| 493735 | 6/1950 | France | 33/443 |

*Primary Examiner*—Willis Little
*Attorney, Agent, or Firm*—Cantor and Lessler

[57] ABSTRACT

A guide clamp is disclosed which includes a clamping jaw at one end of a guide bar. An opposing shifting jaw is slidably carried on the guide bar to permit a workpiece to be embraced by the jaws. A pull rod associated with and parallel to the guide bar is connected to a lever on the clamp jaw. The shifting jaw locks onto this pull rod when the jaws embrace a workpiece and actuation of the lever then pulls the jaws together to clamp onto the workpiece and hold the guide clamp thereon. The shifting jaw will lock onto the pull rod by engaging a smooth-surfaced pull rod with a frictional grip or by engaging threads or notches on the pull rod with a locking grip. Guideways to guide and hold tools, jigs and the like are provided on the guide bar.

11 Claims, 27 Drawing Figures

U.S. Patent   Jan. 1, 1985   Sheet 1 of 5   4,490,920
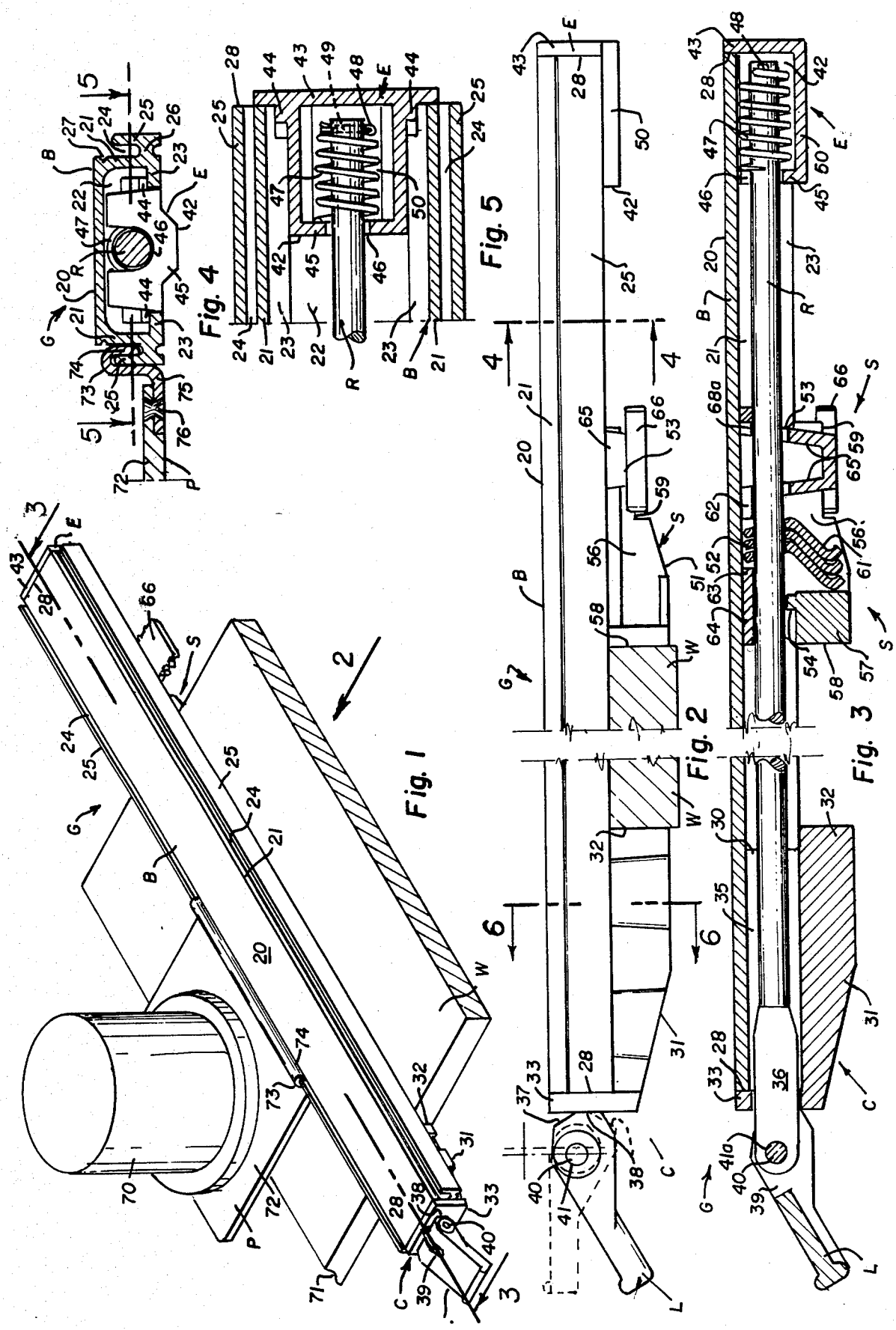

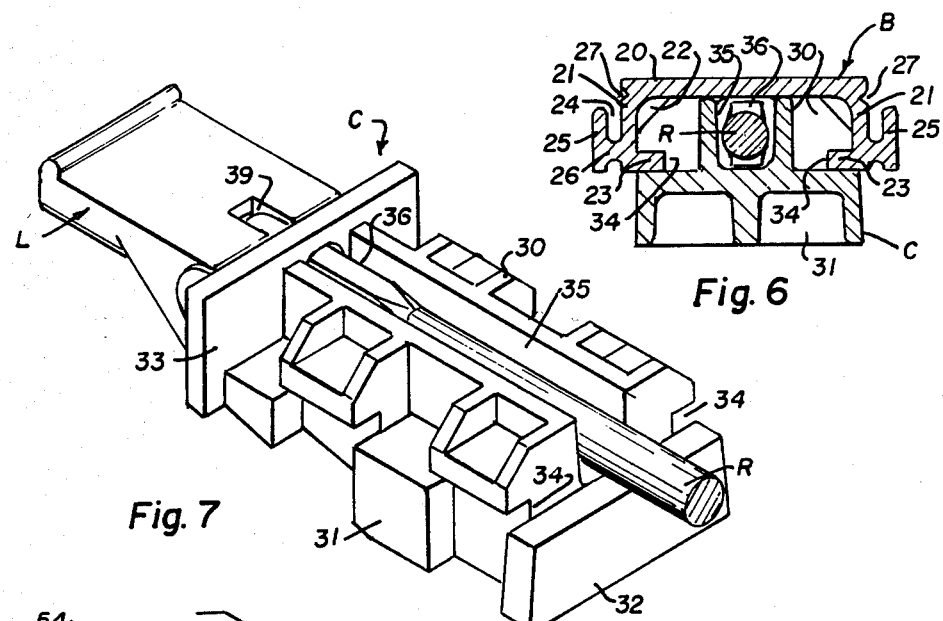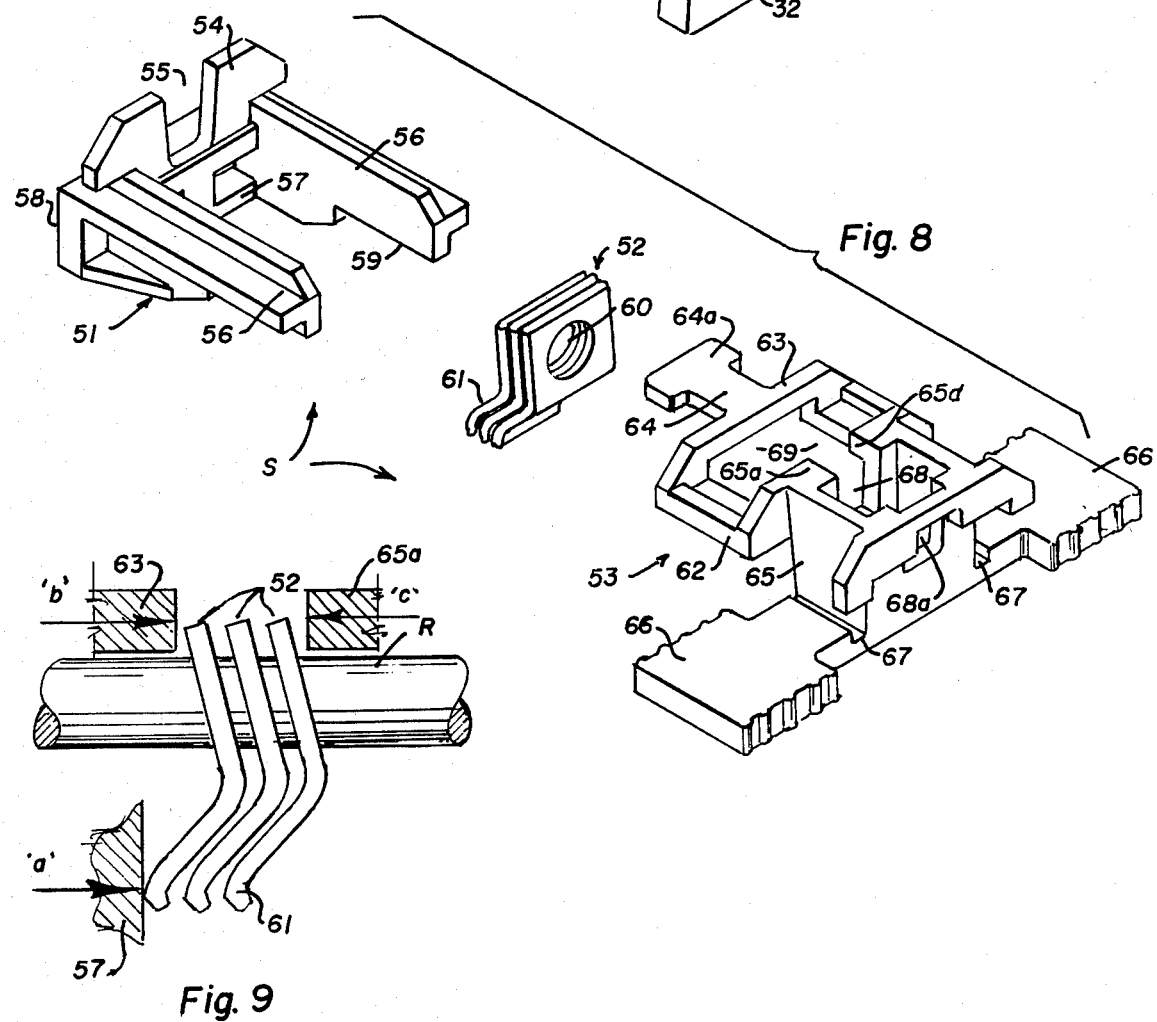

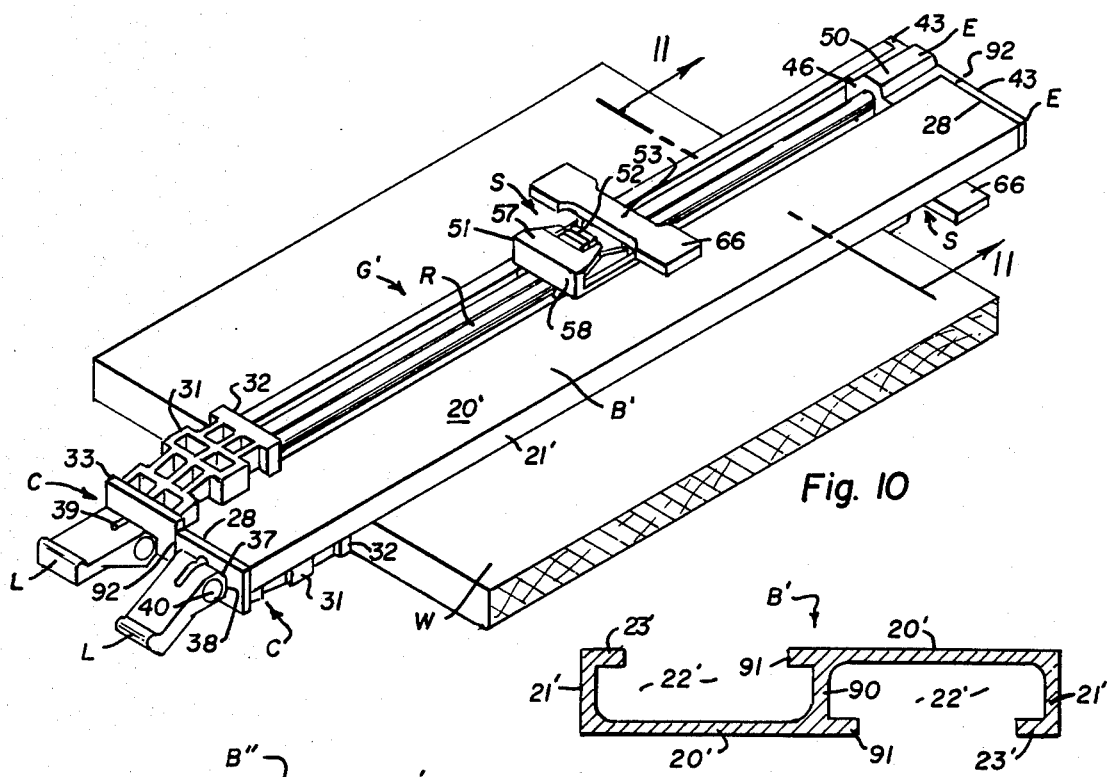
Fig. 10
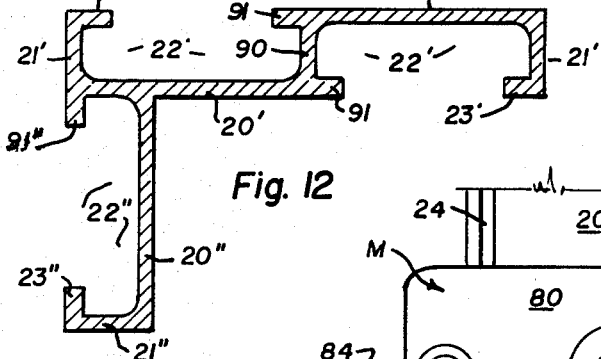
Fig. 11
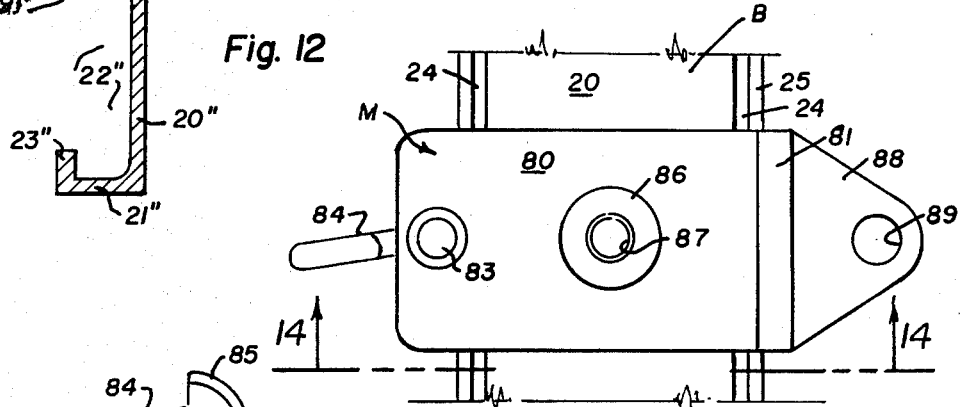
Fig. 12
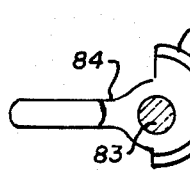
Fig. 15
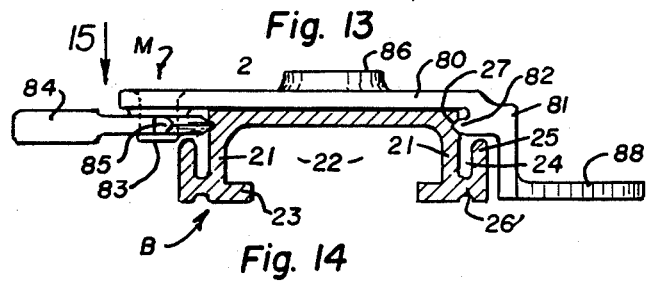
Fig. 13
Fig. 14

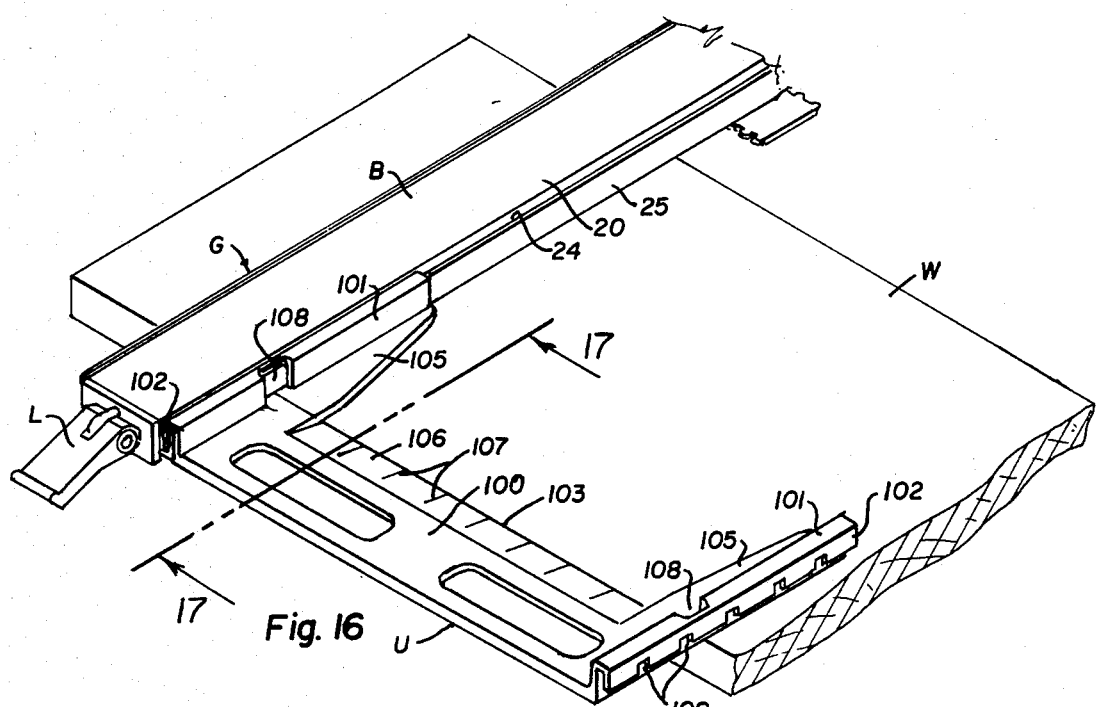
Fig. 16
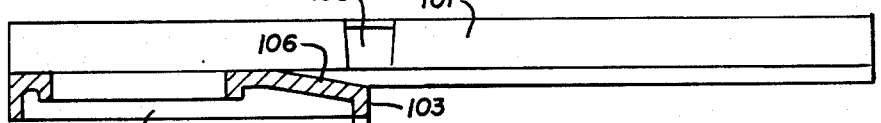
Fig. 17
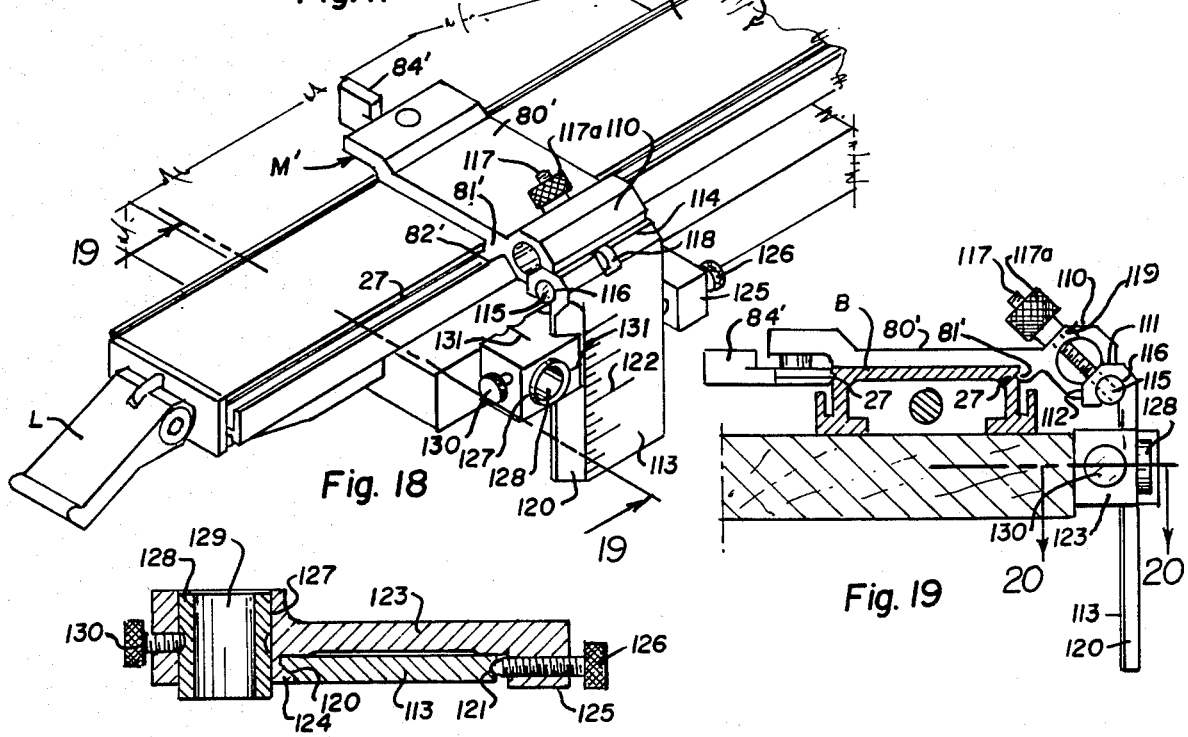
Fig. 18
Fig. 19
Fig. 20

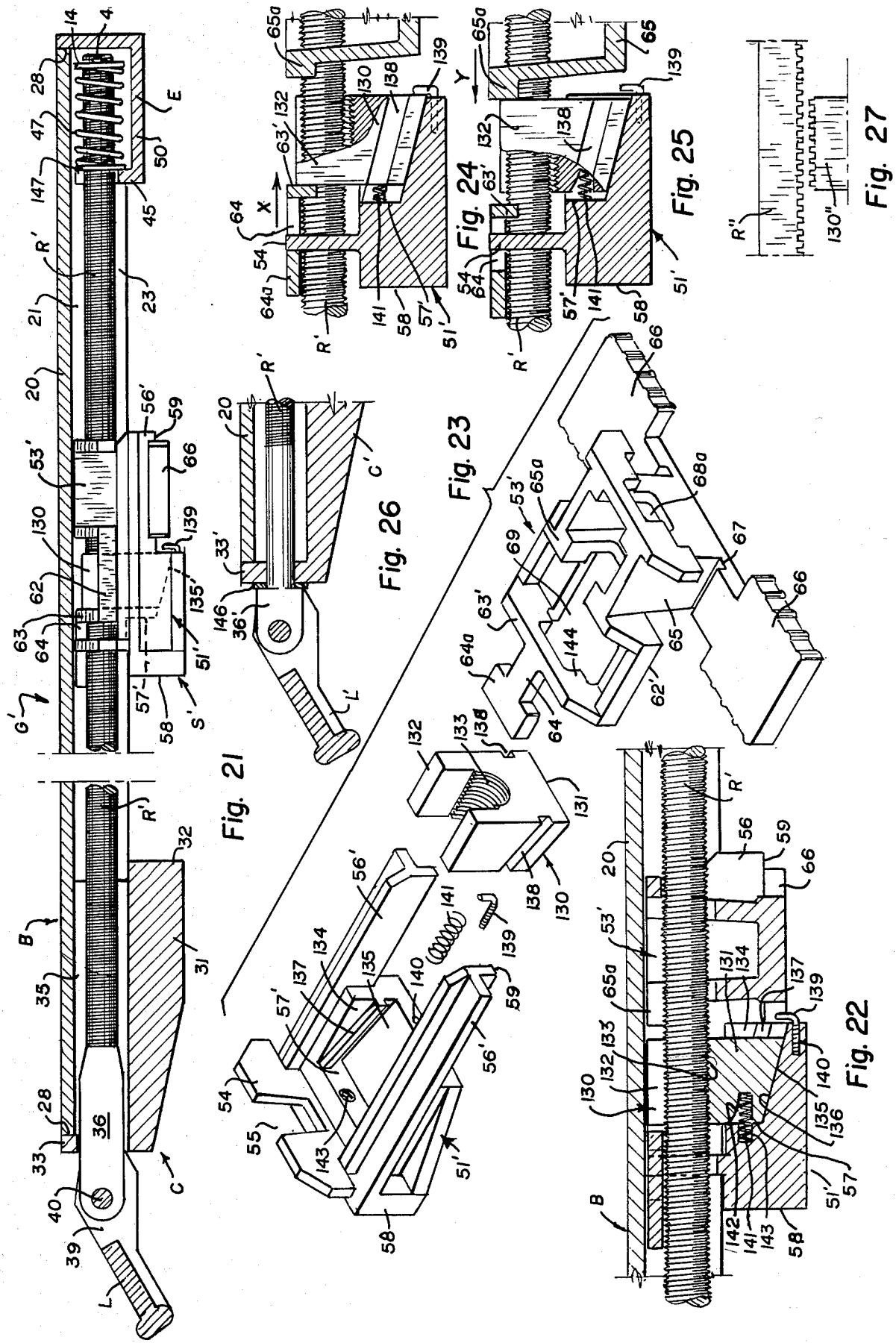

GUIDE CLAMP

CROSS-REFERENCE TO RELATED APPLICATION

This application is a continuation-in-part of my copending U.S. patent application Ser. No. 326,840, filed Dec. 3, 1981, now U.S. Pat. No. 4,394,800.

BACKGROUND OF THE INVENTION

The present invention relates to tool guiding and marking devices and more particularly to guides and markers which are clamped to a workpiece. As such, the invention will be hereinafter called a "guide clamp".

Guide clamps are not new and the patent to William J. Fortune, U.S. Pat. No. 3,287,808 is exemplary of the prior art. The basic features of a guide clamp include a guide bar having a pair of gripping jaws at one side of the bar to clamp onto a workpiece such as a board. One jaw, the clamping jaw, is at one end of the bar. The other jaw, the shifting jaw, may be positioned along the reach of the bar to bring the jaws against the edges of the workpiece and the clamping jaw will then secure the guide clamp onto the workpiece. The guide clamp may be used for various purposes such as for marking or as an abutment for a power hand saw which is held against the guide clamp as it makes a cut across the workpiece.

The present invention, an improved guide clamp, was conceived and developed to make possible a heretofore unrealized potential for such a tool, especially for precision and custom woodworking. A conventional guide clamp can serve as a guiding abutment for a power hand saw but the guide clamp is not always satisfactory for other types of power hand tools such as a router. The vibration and other action of such a tool can move the tool away from the edge of the guide clamp even when it is tightly held. An improved guide clamp which will positively hold and guide a tool across a workpiece is needed. Also, a guide clamp which can be precisely positioned on a workpiece to hold jigs and the like for precision operations is needed.

SUMMARY OF THE INVENTION

Accordingly, an object of the present invention is to provide a novel and improved guide clamp which will hold a power hand tool, such as a router, in proper position and in precise alignment as it moves across a workpiece along a path established by the guide clamp.

Another object of the invention is to provide a novel and improved guide clamp, and auxiliary attachments for it, which permits small, light-weight power hand tools, and other special tools, to be used for precision woodworking operations which are ordinarily performed on table saws and with other heavy machinery, and permits light-weight manual tools to match or even exceed the performance of table saws and other shop machinery.

Another object of the invention is to provide a novel and improved guide clamp which can be quickly and easily mounted upon a workpiece, in a fraction of the time a standard clamp can be so mounted, and can be secured to the workpiece by the simple pushing of a lever, and with no portion of the jaws or other parts of the clamp projecting below the workpiece so that the workpiece will lie flat upon a bench or table with the guide clamp in place.

Another object of the invention is to provide a novel and improved guide clamp having precisely aligned guiding edges which will not deflect or warp by stresses created whenever the guide clamp is tightly fitted upon the workpiece.

Another object of the invention is to provide, in a novel and improved guide clamp, an adjustable shifting jaw which is easily moved along the clamp bar in either direction and to any selected position to automatically lock in place at the selected position.

Another object of the invention is to provide a novel and improved guide clamp having an adjustable shifting jaw which locks on a pull rod with a positive locking action.

Another object of the invention is to provide a novel and improved guide clamp structure which may be easily modified to serve as a portable, long-reaching bench clamp for holding a workpiece at the top or side of a work bench and wherein the vice jaws extend above the clamp surface only a short distance to be below the working surface of a thin board or workpiece.

Another object of the invention is to provide a novel and improved guide clamp which is easily portable and combines in a single unit the ability to be a woodworking clamp, an accurate straight edge, an accurate and safe guide for hand tools and as a base on which other tools may be affixed.

Yet another object of the invention is to provide a novel and improved guide clamp which may be manufactured primarily from extruded and molded components to form a simple, reliable, neat-appearing, low-cost, rugged and durable unit.

Yet another object of the invention is to provide, in combination with a guide clamp, an improved and simplified squaring arm and gauge and an improved doweling jig for precise hole drilling.

BRIEF DESCRIPTION OF THE DRAWINGS

With the foregoing and other objects in view, all of which more fully hereinafter appear, my invention comprises certain constructions, combinations and arrangements of parts and elements as hereinafter described, defined in the appended claims and illustrated in preferred embodiments in the accompanying drawings, in which:

FIG. 1 is an isometric view of the improved guide clamp mounted upon and near an end of a board, the workpiece, and with an accessory slide plate connected to the bar of the guide clamp to hold a router to shape the end of the board;

FIG. 2 is a side elevational view as from the indicated arrow 2 at FIG. 1 but on an enlarged scale and with portions broken away to conserve space;

FIG. 3 is a longitudinal sectional elevational view as taken from the indicated line 3—3 at FIG. 1 but on an enlarged scale and with portions broken away to conserve space;

FIG. 4 is a transverse sectional elevational view as taken from the indicated line 4—4 at FIG. 2 but also showing a portion of the accessory slide plate shown at FIG. 1;

FIG. 5 is a fragmentary sectional plan view as taken from the indicated line 5—5 at FIG. 4;

FIG. 6 is a transverse sectional elevational view as taken from the indicated line 6—6 at FIG. 2;

FIG. 7 is an isometric view of the clamping jaw of the guide clamp;

FIG. 8 is an exploded isometric view of the components of the shifting jaw;

FIG. 9 is an enlarged, diagrammatic fragmentary elevational view of locking members of the shifting jaw mounted upon a holding rod within the guide clamp and with arrows indicating pressure points for the gripping and releasing of the shifting jaw;

FIG. 10. is an isometric view similar to FIG. 1 but showing a double clamp unit which functions as a bench-mounted clamp vise for holding a workpiece on a bench;

FIG. 11 is a transverse sectional view of the guide bar of the double unit, as taken from the indicated line 11—11 at FIG. 10 but on an enlarged scale;

FIG. 12 is a transverse sectional view similar to FIG. 11 but showing a further modified guide bar to function as a triple unit to include a side clamp;

FIG. 13 is a fragmentary plan view of the guide clamp shown at FIG. 1 and with an accessory plate clamped upon the guide bar;

FIG. 14 is a sectional elevational view as taken from the indicated line 14—14 at FIG. 13;

FIG. 15 is a fragmentary detail of a clamping lock as viewed from the indicated arrow 15 at FIG. 14;

FIG. 16 is an isometric view, similar to FIG. 1 but showing an improved squaring gauge affixed to the guide clamp in position for squaring the guide clamp on a workpiece;

FIG. 17 is a sectional view of the squaring arm per se as taken from the indicated line 17—17 at FIG. 16 but on an enlarged scale;

FIG. 18 is an isometric view of a portion of a guide clamp mounted on a workpiece, near an end thereof, and with an improved dowel-hole jig mounted on the guide bar to permit precise drilling of dowel holes in the workpiece;

FIG. 19 is a sectional view as taken from the indicated line 19—19 at FIG. 18 but on an enlarged scale;

FIG. 20 is a sectional view as taken from the indicated line 20—20 at FIG. 19;

FIG. 21 is a longitudinal elevational view similar to FIG. 3, showing the guide bar in section, but with a threaded pull rod and a modified shifting jaw being shown in full;

FIG. 22 is an enlarged view of a portion of FIG. 21 showing the modified shifting jaw in section and engaging the threaded pull rod;

FIG. 23 is an exploded isometric view of the modified shifting jaw;

FIG. 24, is a diagrammatic, fragmentary elevational view of portions of the shifting jaw, similar to FIG. 22 but with the shifting jaw being disengaged from the pull rod and its components being shifted as when it is being moved away from a workpiece between the jaws of the clamp;

FIG. 25 is a diagrammatic, fragmentary elevational view similar to FIG. 24, with the shifting jaw being disengaged from the pull rod and its components being shifted as when it is moving towards a workpiece between the jaws of the clamp;

FIG. 26 is a longitudinal sectional view of the clamp jaw end of a guide clamp, similar to that shown at FIG. 21 but with a modified construction to permit rotation of the pull rod; and FIG. 27 is a fragmentary diagrammatic view of the components of another modified pull rod, wherein rack teeth at one side of the pull rod can engage similar rack teeth on a shifting jaw.

DETAILED DESCRIPTION OF THE PREFERRED EMBODIMENTS

Referring more particularly to the drawings, the improved guide clamp G includes a straight elongate bar B. A clamp jaw C is affixed to the head end of the bar, an opposing shifting jaw S is movable along the reach of the bar and an end cap E is affixed to the rearward end of the bar. The clamp and shifting jaws C and S depend from the underside of the bar B to grip the opposite edges of workpiece W such as a board. The jaws are spaced for gripping the workpiece by moving the shifting jaw S and the bar B is then locked upon the workpiece W by depressing a lever L outstanding from the clamp jaw, as illustrated at FIGS. 1 and 2 and hereinafter further described. It is to be noted that this guide clamp G may be of any length necessary to accommodate and fit upon any workpiece with which it will be used.

The bar B is channel-shaped with a top surface 20 constituting the web portion of a channel and with legs 21 depending from the edges of the top surface 20 constituting the flange portions of the channel. The cavity 22 between these legs 21 is constricted at its lower opening by an inturned lip 23 at the bottom of each leg 21. The upper portions of the clamp jaw C and shifting jaw S and the end cap E fit into this cavity 22. Also, a pull rod R extends longitudinally through the cavity 22 to connect with the clamp jaw lever L and the end cap E. This rod R passes through the upper portion of the shifting jaw S to engage with a locking means at the jaw S at any selected position of the jaw in the channel as will be described.

When the guide clamp G is attached to a workpiece W, it can be used for a number of operations such as for marking or for guiding a power hand saw across the workpiece. Also, the guide clamp G is capable of more complex and more precise operations since the bar B is provided with guiding means capable of receiving slidable or fixed auxiliary attachments. For example, a slidable router plate P is shown at FIGS. 1 and 4, a fixed mounting head M is shown at FIGS. 13 and 14, a slidable squaring gauge U is shown at FIGS. 16 and 17 and a dowel jig D is shown at FIGS. 18, 19, and 20. To hold a slidable auxiliary attachment, a slide slot 24 is formed alongside each leg 21 by a flange 25 upstanding from an outwardly projecting shoulder 26 at the base of the leg. To hold a fixed auxiliary attachment, a notched guideway 27 is located at the outer face of each leg 21 near its top edge and above the flange 25.

The channel-shaped bar B is preferably a symmetrical unit to provide a neat appearance and to permit attachments to be used at either side of the bar. The bar B may be manufactured as an extrusion of aluminum or other metal, or of a hard, rigid synthetic resin plastic. The extrusion may be cut to selected lengths for economical manufacture of the bars. The only machining operations necessary will be the squaring of the ends 28 to better fit with the clamp jaw C and the end cap E. Proper extrusion will produce a stright, precisely aligned bar and it is to be noted that there will be no undue stress on the bar, to cause it to twist or bend, whenever the guide clamp is tightly clamped on a workpiece W. This is because the jaws are pulled together to grip the workpiece by the pull rod R.

The clamp jaw C, as shown at FIGS. 6 and 7, consists of three parts: a support block 30 which fits into the channel cavity 22 of the bar B; an abutment 31 below the block 30 which includes the jaw face 32; and, a transverse end plate 33 which abuts against a squared bar end 28 when the support block 30 is fittd into the channel cavity 22. A neck 34 separates the support block 30 and the abutment 31 to receive the inturned lips 23 of the bar legs 21.

The clamp jaw C may be formed as a skeletal structure with pocket-like cavities in both the support block 30 and the abutment 31 in any suitable pattern such as illustrated. This cavity pattern saves material and facilitates forming a dimensionally stable unit, especially when the clamp jaw is molded from a selected strong plastic material such as nylon. It is to be noted that nylon is one preferred material for the manufacture of the clamp jaw C, the lever L, the sliding jaw S and the end cap E as with injection molding operations.

A central, longitudinal passageway 35 extends through the support block 30 and through the end plate 33 to receive a flattened end 36 of the pull rod R which connects with the lever L abutted against the out face of the end plate 33 as best shown at FIG. 3. The lever L is a rectangular member of suitable length and width for easy gripping. The transverse abutment end of this lever is enlarged to include a cam face having a release seat 37 and a clamping seat 38. Also, a central longitudinal slot 39 in this abutment end of the lever receives the flattened rod end 36. The rod R and lever L are interconnected by a pivot pin 40 extended through a transverse hole 41 in the abutment end of the lever and a mating hole 41a in the end of the rod R.

The release seat 37 of the cam face is normal to the top surface of the lever L so that the lever outstands from the end plate 33 in spaced parallelism with the top surface 20 of the bar B whenever the guide clamp is at the released position. The clamping seat 38 is angled to engage the end plate 33 whenever the lever is depressed, as from the dotted line position to the solid line position shown at FIG. 2. The radial distance of the clamping seat 38 from the axis of the pivot pin 40 is greater than that of the release seat 37, thus depressing the lever L results in pulling the rod R to effect a clamping of the jaws as hereinafter further described.

It is to be noted that the distance the lever L is depressed to engage the clamping seat 38 is such that the outer tip of the lever is not below the bottom of the jaw face 32. The height of the clamp jaw face 32 and the opposing face of the sliding jaw S is preferably slightly less than five-eighths inch. Thus, the guide clamp G can grip comparatively thin boards and plywood sheets which are lying upon a bench without the lever L or the jaws contacting the surface of the bench.

The end cap E at the opposite end of the bar B is formed as an open-top, box-shaped body 42 proportioned to fit into the cavity 22 between the lips 23. The outer face of the body 42 is a transverse end plate 43 which abuts against a squared bar end 28 when the body 42 is fitted into the channel cavity 22. Ears 44 project from each side of the body 42 to rest upon the lips 23 to hold the body 42 in position in the channel cavity 22 as best shown at FIGS. 4 and 5. The inner face 45 of the body 42 has a central opening 46 through which an end of the rod R extends. A spring 47 within the body 42 and about the rod R is held in compression against the inner face 45 by a cotter pin 48 extended through a hole 49 at the end of the rod. Accordingly, the rod R is held in tension and thus holds the clamp jaw C and the end cap E in position upon the bar B. Also, the spring 47 permits the rod R to shift longitudinally within the bar B responsive to movement of the lever L. To better accommodate this spring 47, the floor 50 of the end cap is projected a short distance below the legs 21 of the bar B.

The shifting jaw S combines a jaw block 51, lock clips 52 and a shiftable release carrier 53 as best shown at FIGS. 3, 8 and 9. The jaw block 51 includes a transversely disposed head 54 which fits in the bar cavity 22 above the inturned lips 23. This head 54 is positioned at the forward side of the shifting jaw, that is, the side facing the clamp jaw C. The head includes a central passageway 55 to accommodate the rod R and a latch on the release carrier 53 as hereinafter described. A pair of spaced, opposing T-shaped guides 56 are positioned below and are extended rearwardly from the head 54 to embrace the inner faces and under sides of the inturned lips 23 and slidably connect with the release carrier 53. An abutment 57 is positioned below the head 54 and below and between the guides 56 to carry the jaw face 58. The forward portion of each guide is widened to extend downwardly and merge with the abutment 57. The rearward end of each guide 56 has an undersurface 59 which is parallel with the undersurface of the lip 23 thereabove.

The lock clips 52 are rectangular, hardened, bent plates nested together to function in unison. A hole 60 at the upper end of each clip is fitted upon the rod R and the lower portions of the clips fit between the guides 56 below the rod. The holes 60 are sized such that the clips 52 easily slide upon the rod R whenever the clips are normal to the rod R but the clips 52 lock on the rod whenever they are tipped from the normal. The bend of each clip 52 provides a bottom finger 61 which inclines downwardly and forwardly to cause the clip to hang at a tipped position on the rod to initiate locking and to engage the jaw abutment 57. Such engagement, as indicated by the arrow 'a' at FIG. 9, will cause further tipping and locking of the clips on the rod R whenever the shifting jaw S moves against a workpiece.

Even a slight pressure of the abutment 57 against the clips affects the locking action. Thus, a fitting of the jaws 32 and 58 against the edges of a workpiece followed by a depression of the lever L moves the jaws together with a substantial force as that portion of the rod R between the jaws is shortened by the lever action. Thus, the bar B is securely held in place upon a workpiece with all tension stress being in the rod R and with minimal stresses acting on the bar B so that the bar will not bend or twist.

The release carrier 53 includes a skeletal box 62 which fits in the bar cavity 22 above the inturned lips 23. A top crossbar 63 is located at the forward end of this box to fit in the cavity above the rod R. A central latch 64 cantilevers forwardly from this crossbar 63 to extend above the rod R with the shank of the latch 64 lying in the passageway 55 of the jaw block 51 with the carrier 53 and the jaw block 51 thus fitted together. A head 64a at the end of the latch holds these two parts together with the length of the latch shank being such as to permit a small longitudinal movement between the carrier 53 and the jaw block 51, sufficient to effect releasing of the clips 52 from the rod R as hereinafter described.

A rectangular post 65 at the rearward portion of the box 62 extends downwardly between the jaw block guides 56 to carry a pair of wings 66 which are extended laterally from the sidewalls of the post and below the bar B. A slide slot 67 at the base of each wing 66 adjacent to the side of the post receives the under surface 59 of the adjacent jaw block guide 56 to hold the jaw block and the release carrier together. To complete this post 65, passageways 68 and 68a are provided at the upper portion of the end walls of the post and the rod R extends through these passageways.

The central portion of the box 62 is open, as at 69, to receive the tops of the clips 52. Thus, in the assembly of the shifting jaw S, the jaw block 51 and the release carrier 53 are fitted together with the lock clips 52 in place between them as illustrated at FIG. 3. The rod R is then threaded through the passageways 55 and 68 and through the lock clip holes 60. At the same time or in any suitable sequence the shifting jaw S is slid into position in the cavity 22 of the bar B and the other components, the clamp jaw C and the end cap E are connected to the rod R and are mounted in the ends of the bar B to assemble the guide clamp G.

As heretofore described, the pressure of the fingers 61 against the lock jaw abutment 57 causes locking of the lock clips 52 onto the rod R. To unlock these clips and permit movement of the shifting jaw S along the bar B, in either direction, it is merely necessary to release the lever L and to push against the conveniently located wings 66 in the direction desired. Once the lever L is released, a rearward movement of the wings 66 shifts the release carrier 53 rearwardly with respect to the jaw block 51 until the cross bar 63 engages the top of the clips 52 as at arrow 'b' at FIG. 9. The clips 52 are then squared on the rod R to release therefrom and permit rearward movement of the shifting jaw S. A forward movement of the wings shifts the release carrier and jaw block 51 forwardly and the lock clip fingers 61 move away from the jaw block abutment 57 to engage the forwardly extended ledges 65a at the top of the post 65, as at arrow 'c' at FIG. 9. The shifting jaw S then moves forwardly with a minimal effort.

The guide clamp G may be used as a single guide member for holding and marking and it may also be used with various types of auxiliary equipment as heretofore mentioned. The slidable router plate P, shown at FIGS. 1 and 4, is exemplary of a carrier for cutting and marking tools which move across a workpiece. The router 70 carries a cutter, not shown, which forms an ogee 71 or the like at the end of the workpiece W. The router plate P is a flat sheet 72 adapted to lie upon the workpiece to carry the router 70 or a similar tool. A hook-shaped follower 73 is connected to the edge of the sheet 72 adjacent to the edge of the guide clamp G. The follower 73 is formed with an elongated, downturned finger 74 which fits into the slide slot 24 of the guide clamp. An outward, downturned angled portion extended from the top edge of the finger forms a shelf 75 which connects with the sheet 72. The sheet 72 is suitably notched to receive the shelf 75 and is connected thereto as by rivets 76.

A fixed mounting head M, shown at FIGS. 13 and 14, is useful for holding jigs, templates, trammels and the like. The mounting head includes a flat, rectangular plate 80 which sets upon and overhangs the top surface 20 of the bar B. A flange 81 extends downwardly from one side of the top surface 20 and includes an inturned bevelled edge 82 which fits into the notched guideway 27 of the bar B. A pivot pin 83 depends from the opposite underside of the plate 80 to carry a thumb latch 84 having an eccentric bevelled cam 85 which fits into the adjacent guideway 27. The latch 84 is rotated to lock the holder plate 80 in position. Suitable atttachment means are provided on this plate 80. A boss 86 having a tapped hole 87 may be centered at the top of the plate 80. Also, a shelf 88 may stand out from the bottom edge of the flange 81 to provide a hole 89 wherein a connector pin or the like may be fitted.

The components forming the guide clamp G may be used for other clamping purposes. FIGS. 10 and 11 illustrate a compound guide clamp G' which may be fastened upon a bench or table to hold a workpiece thereon. The compound clamp G' is essentially two clamps side by side with one clamp jaw C and shifting jaw S being turned downwardly to grip the bench and the other clamp jaw and shifting jaw being turned upwardly to grip the workpiece. In the drawing, FIG. 10, both clamp jaws C are at a common end but they may be at opposite ends of the bar B' without any structural change of components. Moreover, all components except the bar B' are essentially the same as heretofore described.

The modified bar B' is an elongated member of a double channel form, rotatively symmetrical. As such, it includes top and bottom surfaces 20' at opposing sides of the bar. A side leg 21' upstands from the bottom surface 20' and a corresponding side leg 21' depends from the top surface 20'. A common central leg 90 extends between the top and bottom surfaces at the center of the bar B'. Inturned lips 23' are provided at the ends of the legs 21' and corresponding lip structures 91 are formed by short overhanging portions of the top and bottom surfaces 20'. Accordingly, the channel cavities 22' can receive the clamp and shifting jaws and end cap E as heretofore described. To permit each clamp jaw C and end cap E to fit upon the central leg 90 without changing the end plates 33 and 43, the lip structures 91 are slightly wider than the lips 23', such that the end plates 33 and 43 fit together at the common central leg 90, as at the juction 92. Another modification to the bar structure is the elimination of the slots 24 and ways 27 since they are not needed for simple clamping purposes. Finally, it may be desirable to reverse the lever L on the upwardly turned clamp jaw C so that both levers of the compound guide clamp G' are pushed downwardly for locking the jaws.

FIG. 12 shows a bar B'', in section, for a further modified compound clamp where a vertical channel cavity 22'' is formed. With this arrangement the triple cavity compound clamp may be secured to the top of a bench and at an edge thereof and the vertically positioned clamp can hold an upright workpiece. The surface 20'' depends from the bottom surface 20'. A leg 21'' having an inturned lip 23'' is at the bottom of the surface 20''. A corresponding lip structure 91'' depends from the edge of the bottom surface 20' to complete the channel cavity 22''.

The squaring gauge U, shown at FIGS. 16 and 17, is used to mount the guide clamp G squarely across a workpiece W. It also provides a marking gauge to precisely locate the guide clamp G at a selected distance from an end of the workpiece or from a mark on the workpiece. The squaring gauge U includes an abutment bar 100 with an inverted channel-shaped follower 101 above and extended laterally from each end of the bar 100, forming a U-shaped structure. Each follower 101 includes an inner leg upstanding from the upper surface of the bar 100 and a shorter outer depending leg 102 which fits into the slot 24 at the side of the guide clamp bar B. The leg 102 attaches the squaring gauge U to the forward end portion of the guide clamp G as illustrated.

When so attached, the lower portion of the abutment bar 100 is at the side of the workpiece W and below the top surface therof so that the inner edge 103 of the bar abuts against the side of the workpiece for squaring the guide clamp G. Suitable fingers 104 depend from this edge 103 to better engage the side of the workpiece.

A side wing 105 stands out from each side of the upper portion of the abutment bar 100 to lie upon the top of the workpiece and to join with and reinforce the outstanding follower 101. The top of the bar 100 between these wings 105 is sloped as at 106 to match the top with the top surface of the workpiece W. A marking scale 107 is provided on this sloped surface 106 and windows 108 are cut in each follower 101 in line with the abutment edge 103 to expose a fragment of the bar flange 25. To complete this squaring guage U, notches 109 may be provided in the outer legs 102 to better prevent sticking of a leg 102 should sawdust or the like be in the slot 24.

The dowel jig D, shown in FIGS. 18, 19 and 20 is carried on a mounting head M' which is similar to the mounting head M heretofore described. One side of a plate 80' has a turned down flange 81' with a turned in bevelled edge 82' which fits into a bar guideway 27. A latch 84' at the opposite side of the plate 80' fits into the opposite bar guideway 27. A gripper jaw 110 stands out from the flange 81' to lie in spaced parallelism with the sides of the guide clamp bar B. The jaw is formed with an overhanging upper lip portion having an abutment face 111 at its underside and a lower lip portion having an abutment face 112 at its outward side, perpendicular to the face 111.

A flat surface gauge arm 113 is held in this gripper jaw 110 with flattened surfaces of a hook-shaped connector end 114 engaging the abutment faces 111 and 112. The flattened surfaces of the end 114 are angled 45 degrees apart with an adjacent surface angled 45 degrees from the surface of the arm 113 and with the surfaces forming part of an octagonal cylinder. With this end 114, the gauge arm can hang perpendicular from the mounting head plate 80' or the arm can swing outwardly 45 degrees or 90 degrees to be inclined with or lie parallel with the plate 80'. The connection of the gauge arm 113 to the gripper jaw 110 is effected by a T-bar which includes a pintle 115 mounted in the passageway 116 of the connector end 114 and a threaded rod 117. The rod 117 is connected to and outstands from the pintle 115 to extend through an arcuate slot 118 at the center of the connector end 114. This threaded rod 117 is fitted into a hole 119 through the jaw 110 between the abutment faces 111 and 112 to be held therein by a take-up nut 117a as illustrated.

The gauge arm 113 is a flat bar with one edge being bevelled as at 120 and the other edge being dished as at 121. A scale is provided adjacent to the bevelled edge as at 122. A C-shaped guide carrier 123 is slidably mounted on this arm 113 with a lip 124 at one side to engage the bevel 120 and with a short finger 125 at the other side to carry a set screw 126 to engage the dished edge 121 and lock the carrier 123 in place on the gauge arm 113. The carrier 123 includes a socket 127 to receive cylindrical insert 128 having a guide hole 129 of a selected drill size. The insert 128 is held in place by a set screw 130. To complete the dowel jig D gauge marks 131 are on the carrier 123 above and at the side of the socket 127 to facilitate aligning a drill at a precise location in a workpiece.

FIGS. 21–25 show a modified guide clamp G' having a threaded pull rod R' and a modified shifting jaw S' which engages the rod R' to provide for a positive locking grip of the shifting jaw to the threaded rod R'. The other features of the guide clamp G' may be unchanged and the same as heretofore described. The bar B is channel-shaped with a top surface 20, depending side legs 21 and an inturned lip 23 at the bottom of each leg 21. A clamp jaw C and an end cap E are fitted into the channel cavity 22 against the squared ends 28, all as hereinbefore described. On the other hand, the pull rod R' is threaded in that portion through which the shifting jaw S' moves and as a practical matter through the entire reach of the rod and to the flattened end 36, as illustrated. The threads may be of any suitable type and pitch but they are preferably fine, for example, a pitch of 24 threads per inch on a ⅜-inch diameter rod.

To engage the threads of the pull rod R', the jaw block 51' of the shifting jaw S' is modified to carry a U-nut 130 instead of the lock clips 52 heretofore described. The U-nut 130 is formed as a block-shaped base 131 with spaced upstanding legs 132 to straddle the pull rod R' and with a curved, threaded crotch 133 to engage and mesh with the threads of the pull rod R'. The base 131 of the U-nut is shiftably mounted in the jaw block 51' in a slotway formed by opposing guide walls 134 at the inner faces of the T-guides 56' and sets upon a floor 135 between these guide walls 134 which slopes rearwardly and downwardly from the transverse abutment wall 57' at the back side of the jaw face 58.

The undersurface 136 of the U-nut base 131 is inclined to match the slope of the slotway floor 135. The slope and the spacing of these components is such that forward movement of the U-nut 130, towards and against the abutment face 57' raises the U-nut to engage the threads of the crotch 133 with the threads of the pull rod R' and thereby lock the shifting jaw S' to the pull rod R' as illustrated at FIG. 22. The pressure of a workpiece against the jaw face 58 will hold the U-nut 130 against the abutment face 57' and securely in the grip of the threads of the rod R'. Movement of the U-nut 130 rearwardly and away from the abutment 57' drops the U-nut 130 to disengage it from the threads of the rod R' and thereby release the shifting jaw S' to permit it to be shifted on the guide clamp bar B, as illustrated at FIGS. 24 and 25.

To secure the U-nut in position in the slotway and hold the undersurface 136 of the U-nut against the sloping floor 135, a track 137 at each guide wall 134 parallels the floor 135 to fit in a corresponding slot 138 in each side of the U-nut base 131. To prevent the U-nut 130 from sliding rearwardly and out of position in the slotway, an L-shaped pin 139 is fitted into a hole 140 in the rear end edge of the floor 135. To provide a bias to urge the U-nut 130 rearwardly and away from the locked position against the abutment 57' whenever there is no pressure of the abutment against the U-nut, a spring 141 is mounted between the U-nut 130 and the abutment 57' in respective, aligned sockets 142 and 143.

The release carrier 53' of the shifting jaw S' will require only minor modifications to accommodate the U-nut 130 instead of the fingers 61, heretofore described. A small corner enlargement 144 on the cross bar 63' may be necessary to provide a better contact with the U-nut wall as shown at FIG. 24. Also, some size modifications may be necessary.

The operations of moving, positioning, locking and releasing the shifting jaw S' are the same as heretofore described. An operator pushes against a wing 66 of the release carrier 53' to move the shifting jaw S' along the bar B in either direction with the U-nut 130 being disengaged from the pull rod R' as indicated by arrows X and Y at FIGS. 24 and 25. When moving rearwardly, as away from a workpiece, an edge of the U-nut 130 engages the cross bar 63', FIG. 24. When moving forwardly, as towards a workpiece, the opposite edge of the U-nut 130 engages the post edge 65a, FIG. 25. Whenever the shifting jaw is moved against a workpiece, the U-nut 130 is then pushed against the abutment 57', as shown in FIG. 22. Then, when the lever L of the clamp jaw C is depressed to pull the rod R', the shifting jaw S' will be locked onto the pull rod R'. Release of the lever L will release this locking pressure between the abutment 57' and the U-nut 130 to permit the spring 141 to push the U-nut 130 to move away from the pull rod R'.

With the threaded pull rod R' being engaged in the U-nut 130 it is possible to obtain a supplementary tightening action between the clamp jaw C and the shifting jaw S' by rotating the pull rod R'. This may be accomplished in several different ways as by using a crank instead of a lever L. Preferably, however, a modified clamp jaw C' provides for a lever L' which may be used as heretofore described and also by rotating it. The modified construction, shown at FIG. 26, provides for the rounded portion of the pull rod R' to extend through an orifice 145 in a modified end plate 33' of the clamp jaw C'. The flattened end 36' of the rod carries the lever L as heretofore described but, preferably, a washer 146 is positioned at the end plate 33' to bear against the end 36' as illustrated. Also, a washer 147 may be used at the inner face 45 of the end cap E to bear against the spring 47 and a washer 148 may be fitted onto the end of the rod R' to bear against the other end of the spring 47 to protect the ends of the spring when the rod R' is turning, as illustrated at FIG. 21.

FIG. 27 illustrates the basic features of a further modification where a pull rod R" and U-nut 130" are formed with notches instead of threads. The notches may be of any desired form such as the rack-teeth illustrated. The action will be the same as described with the U-nut 130" engaging the rod R" to secure the shifting jaw S' in place on the bar B.

The foregoing descriptions are exemplary of my invention and it is to be understood that my protection shall be limited, not by the constructions illustrated and described, but only by the proper scope of the appended claims.

What is claimed is:

1. A guide clamp adapted to grip a workpiece between opposing jaw faces, comprising:
   (a) a bar having guideway means along the reach thereof;
   (b) a clamp jaw means at one end of the bar having a jaw face facing towards the bar and a pull means adapted to be actuated to exert a pull in a direction away from the bar;
   (c) a shifting jaw carried on the guideway means, having a jaw face facing the clamp jaw and being shiftable along the bar to space the jaw faces to embrace a workpiece between them;
   (d) a pull rod extended alongside the bar with one end being attached to the pull means to be pulled thereby; and
   (e) a meshing lock means at the sifting jaw adapted to positively engage the pull rod by meshing with the pull rod to lock the shifting jaw to the pull rod; to normally remain disengaged as the shifting jaw is moved along the bar but to engage and lock with the pull rod whenever the shifting jaw is moved against a workpiece embraced by the jaws.

2. A guide clamp adapted to grip a workpiece between opposing jaw faces, comprising:
   (a) a bar having guideway means along the reach thereof;
   (b) a clamp jaw means at one end of the bar having a jaw face facing towards the bar and a pull means adapted to be actuated to exert a pull in a direction away from the bar;
   (c) a shifting jaw carried on the guideway means, having a jaw face facing the clamp jaw and being shiftable along the bar to space the jaw faces to embrace a workpiece between them;
   (d) a pull rod extended alongside the bar with one end being attached to the pull means to be pulled thereby, and
   (e) a lock means at the shifting jaw adapted to engage the pull rod to lock the shifting jaw to the pull rod and to normally remain disengaged as the shifting jaw is moved along the bar but to engage the pull rod whenever the shifting jaw is moved against a workpiece embraced by the jaws, said lock means including a member adapted to lock with the pull rod whenever said member is pushed against the pull rod and a pushing means associated with the shifting jaw which pushes the said member against the pull rod responsive to movement of the shifting jaw against a workpiece.

3. The guide clamp defined in claim 2, wherein the pull rod is notched and said member is correspondingly notched with the locking action being effected by intermeshing of the notches when said member is pushed against the pull rod.

4. The guide clamp defined in claim 2, wherein the pull rod is threaded and said member is formed as a U-nut having a threaded crotch adapted to engage threads of the pull rod when said member is pushed against the pull rod.

5. The guide clamp defined in claim 4, wherein the pull means is a crank means adapted to rotate the pull rod.

6. A guide clamp adapted to grip a workpiece between opposing jaw faces, comprising:
   (a) a bar having guideway means along the reach thereof;
   (b) a clamp jaw means at one end of the bar having a jaw face facing towards the bar and a pull means adapted to be actuated to exert a pull in a direction away from the bar, said pull means being a lever means;
   (c) a shifting jaw carried on the guideway means, having a jaw face facing the clamp jaw and being shiftable along the bar to space the jaw to embrace a workpiece between them;
   (d) a pull rod extended alongside the bar with one end being attached to the pull means to be pulled thereby; and
   (e) a meshing lock means at the shifting jaw adapted to positively engage the pull rod by meshing with the pull rod to lock the shifting jaw to the pull rod and to normally reamin disengaged as the shifting jaw is moved along the bar but to engage and lock with the pull rod whenever the shifting jaw is moved against a workpiece embraced by the jaws.

7. A guide clamp adapted to grip a workpiece between opposing jaw faces, comprising:
   (a) a bar having guideway means along the reach thereof;
   (b) a clamp jaw means at one end of the bar having a jaw face facing towards the bar and a pull means adapted to be actuated to exert a pull in a dircetion away from the bar;
   (c) a shifting jaw carried on the guideway means, having a jaw face facing the clamp jaw and being shiftable along the bar to space the jaw faces to embrace a workpiece between them;
   (d) a pull rod extended alongside the bar with one end being attached to the pull means to be pulled thereby; and
   (e) a lock means at the shifting jaw adapted to engage the pull rod to lock the shifting jaw to the pull rod and to normally remain disengaged as the shifting jaw is moved along the bar but to engage the pull rod whenever the shifting jaw is moved against a workpiece embraced by the jaws;
   (f) wherein said bar is channel-shaped with a central top surface and a leg depending from each side thereof, the guideway means includes an inturned lip at the bottom of each leg, and the pull rod is carried in the logitudinal channel cavity formed by the top, the legs and the inturned lips; and wherein:
      (1) the shifting jaw includes:
         (i) a jaw block having a head portion slidably mounted in the guideway means with a passageway therein wherethrough the pull rod extends, an abutment portion below the head portion having a jaw face at the forward side and an abutment face at the rearward side, and a slotway extended rearwardly from the abutment face; and
         (ii) a release carrier shiftably connected to the jaw block, rearwardly of the jaw block, and having spaced apart forward and rearward release abutments at the slotway; and
      (2) the lock means includes:
         (i) a body portion having a base carried in the slotway and extended therefrom to be between the forward and rearward release abutments with the forward release abutment being adapted to engage the forward side of the body portion when the release carrier is shifted rearwardly to move the body portion away from the jaw block abutment face and with the rearward release carrier abutment adapted to engage the rearward side of the body portion when the release carrier is shifted forwardly to move the body portion towards the jaw block abutment face;
         (ii) a block means on the body portion to lock with the pull rod whenever the body portion moves upwardly and against the pull rod; and
         (iii) a guide means in the slotway adapted to move the body portion against the pull rod whenever the body portion moves against the jaw block abutment face.

8. The guide clamp defined in claim 7, wherein said guide means includes a floor in said slotway, sloping downwardly and rearwardly from the abutment face, and said body portion base is formed with a sloping undersurface corresponding to the sloping floor to move the body portion against the pull rod when the body portion moves to the jaw block abutment face.

9. The guide clamp defined in claim 8, including a bias means between the body portion and the abutment face to prevent the body portion from moving to the abutment face when the shifting jaw is being moved on the bar but permit the body portion to move against the abutment face when pressure is exerted as when the jaw face engages and moves against a workpiece.

10. The guide clamp defined in claim 9, wherein the pull rod is threaded and the body portion is formed as a U-nut having legs upstanding from the base to straddle the pull rod and the lock means comprises a threaded crotch between the legs to engage the threaded rod.

11. The guide clamp defined in claim 9, wherein the aforesaid clamp jaw means rotatably connects with the pull rod, and is adapted to be rotated to rotate the pull rod to tighten or loosen the pressure between the clamp and shifting jaws when the guide clamp is holding a workpiece.

* * * * *